Sept. 20, 1932.    W. G. WILSON    1,878,222
VALVE AND THE LIKE
Filed Oct. 4, 1927    2 Sheets-Sheet 1

Inventor
Wylie G. Wilson
By his Attorney
Frank J. Kent

Sept. 20, 1932. W. G. WILSON 1,878,222
VALVE AND THE LIKE
Filed Oct. 4, 1927  2 Sheets-Sheet 2

Wylie G. Wilson Inventor
By his Attorney
Frank Kent

Patented Sept. 20, 1932

1,878,222

UNITED STATES PATENT OFFICE

WYLIE G. WILSON, OF ELIZABETH, NEW JERSEY

VALVE AND THE LIKE

Application filed October 4, 1927. Serial No. 223,926.

The present invention relates to lock, grip, or seal work, and provides a new and improved method and apparatus, particularly valuable in valve work.

The illustrative forms of the invention to be described, therefore, will be embodiments of the invention incorporating co-acting valve-member and valve-seat elements; but the appended claims are not intended to be limited to valves.

Since the word "annulus" is employed throughout the description of my invention, it is deemed advisable to point out that when so employed herein, it will be understood to mean either a true annulus or an annulus portion integrally carried by a suitable body. The expression true annulus is meant to define a ring member complete in itself in the sense that such ring member has an outer bounding peripheral wall as well as an inner bounding circumferential wall.

My invention, briefly, involves the utilization of the fact that when an annulus (as just defined), of appreciable width and sensible thickness is subjected to the simultaneous application of substantially axially directed and reversely acting pressures, and when the pressure in one of said directions is applied at a point which, radially of the annulus is appreciably nearer an inner circumferential edge thereof than the resistance to pressure in the opposing direction, the annulus will be distorted cross-axially, so that one corner edge of the inner circumference will be contracted or decreased in circumferential dimensions and the diagonally opposite corner edge of the outer periphery, if the annulus be a true annulus, will be expanded or increased in circumferential direction. By proper confinement and support, I have found that these reverse effects, betraying themselves in a true annulus, by duplex diametral changes as just described, may be utilized cumulatively in any annulus of proper material to secure a gripping and sealing engagement of the annulus around an embraced pipe, shaft, rod or the like.

One object of the invention is to provide a valve of comparatively simple form, which is composed of few parts and is by reason of its construction, unlikely to get out of order, which valve will, by reason of its construction and the construction of its co-operating seat, effect a gripping and sealing engagement, so that an absolutely tight joint is effected.

The broadly new features of the invention and details by which the same may be practically applied are set forth hereinafter, and structural exemplifications of various possible forms of the invention are illustrated in the drawings accompanying and forming part of the specification.

Various other objects and advantages of the invention than those hereinabove mentioned will be specifically pointed out or will be apparent hereinafter in the course of the below detailed description of the form of the invention shown, in the accompanying drawings, as preferred ones of the various possible embodiments of the invention; it being understood, naturally, that such forms are merely illustrative of some of the many possible combinations and arrangements of parts well calculated to attain the objects of the invention, and hence said detailed description of such forms is not to be taken as at all defining or limiting the invention itself. That is to say, the scope of protection contemplated is of course to be taken from the appended claims, interpreted as broadly as is consistent with the prior art.

Figure 4:
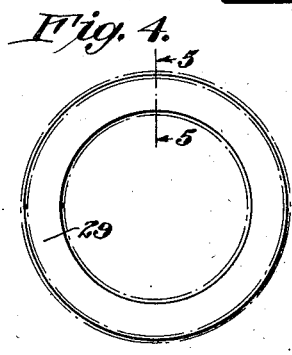
Figure 5:
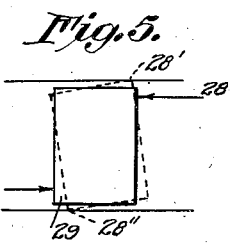

Figure 4 is a plan view of an annulus, illustrating diagrammatically the tilting-distortion which takes place by the seating of the valve; and Figure 5 is a diagrammatic view of a section of the annulus disclosed in Figure 4, such section being taken on the line 5—5 of Figure 4, looking in the direction of the arrows and illustrating the bending or distortion of the annulus caused by the seating pressure of the valve.

Throughout the various views of the drawings, similar reference characters designate similar parts.

In order that the principle by which my invention is carried out will be understood, it is deemed advisable to illustrate such principle. If a sheet of metal of appreciable thickness is taken and a hole is punched through it with a die, it will be found that the hole in the metal will not be truly cylindrical throughout. That is to say the walls of the punched opening will not be uniform in diameter but such opening will be in frustoconical form with the upper end of the opening where the die entered having the smallest diameter. It is now my theory that this is due to the distortion to conicity of the flat sides of the plate or sheet of metal itself. Further, if the plate or sheet of metal in which such hole has been formed is of a distinctly elastic nature, as bronze, and the distortion which takes place during the production of the hole has not strained too greatly the normal elastic tendency of the metal plate, then it is apparent that the metal plate will tend to spring back to uniplanar condition, and impart to the hole a true cylindrical shape, on the removal of pressure. Underlying the present invention is the broad principle exhibiting itself in a plate punching operation as just described; that is, the warping or tilting of a flat or quasi-flat plate to tilt an edge of the plate to make a seal against an adjacent surface.

Figure 1:
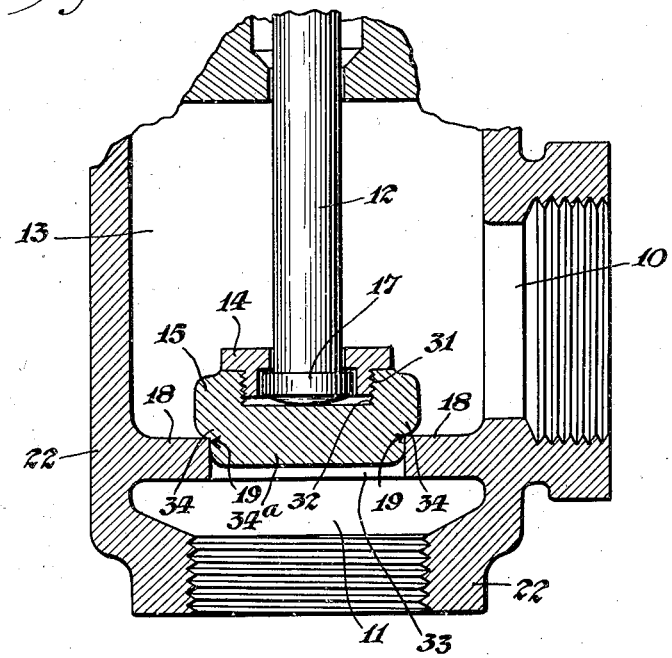
Figure 1 is a sectional view of a valve-chamber disclosing the valve-seat and valve co-operating therewith.

Referring to Fig. 1: At 22 is shown the valve casing which is provided with a fluid ingress opening 10 and a fluid egress opening 11. At 13 is disclosed the valve-chamber disposed within the casing 22. The interior of the casing is provided with an integrally formed inwardly projecting flange 18, which is in the general form of an annulus and which acts as a valve seat for the valve, preventing fluid passing out of the opening 10 from passing out of the opening 11 until the valve has been raised. The valve stem is shown at 12 and the same is provided with an enlarged head 17 over which is positioned a washer 14, which is externally threaded as at 31, said threaded part being received into a complementary threaded part 32 in the valve head 15.

In the construction just described, it will be seen that the valve stem 12 is connected to the valve head 15 and the assembly of the valve head and stem move together as a unit to and from the seat 18. The valve seat 18 is provided with an opening 33 with which the valve head 15 co-acts in such manner that the action of forcing the head 15 against the seat area marginal to said opening causes a distortion of the seat 18 and tends to cause the upper preferably sharp circumferential edge 19 of the seat or flange 18 to be forced very tightly against a peripheral line on the valve-head 15; such line being in the close neighborhood of the juncture of shoulder 34 and the reduced lowermost part 34a of the valve-head. In other words, there is set up along said peripheral sealing line a pressure-intensified intimacy of contact, and hence a tight though impermanent joint, between valve-member and valve-seat. The pressure directly causing this intimacy-of-contact intensification, exhibits itself cross-axially of the valve-member; yet such cross-axial pressure results itself directly from the "first-cause" or "prime mover" pressure manifested between valve-member and valve-seat and directed axially of the valve-member,—the latter or axial pressure being antecedently applied (by an infinitesimal fraction of time, in a quick valve closing operation), and also simultaneously applied, relatively to the cross-axial pressure which it is the ultimate object of the invention to establish. In the present construction, said axial pressure causes the valve-head 15 to move down against the valve-seat or flange 18; whereby the following things occur, in the following order: First, following the instant of contact between valve-head and valve-seat, the valve-seat is flexed or bent (between radial lines converging toward opening 33, but not along such lines preferably) out of its uniplanar set. Second, but simultaneously with or rather incidental to such throwing of the seat or flange 18 to a conical set, the circular edge 19 is tilted, at each point therearound, in and down; whereupon the aforesaid pressure-intensified intimacy of contact approaches consummation, if it is not actually established. Third, continued maintenance of the axial pressure holds said intimacy of contact, or increase of the axial pressure finally consummates the intimate contact prevised, as the case may be, but in both cases due to the elastic tendency of the seat or flange to return to uniplanar set while distorted therefrom. During the distortion of the valve-seat or flange 18, there is probably a very slight downward movement of the valve-member relative to the valve-seat, such that the valve-head is forced somewhat down into the opening 33 as well as forced against the portion of the valve-seat marginal to such opening. This slight relative movement between valve-member and valve-seat, subsequent to the instant of first contact in a valve-closing operation, almost certainly occurs, if we assume that the downward movement of the edge 19 has a greater tendency to enlarge the area of opening 33 at said edge than the simultaneous inward movement of said edge 19 has a tendency to decrease such area.

Figure 2:
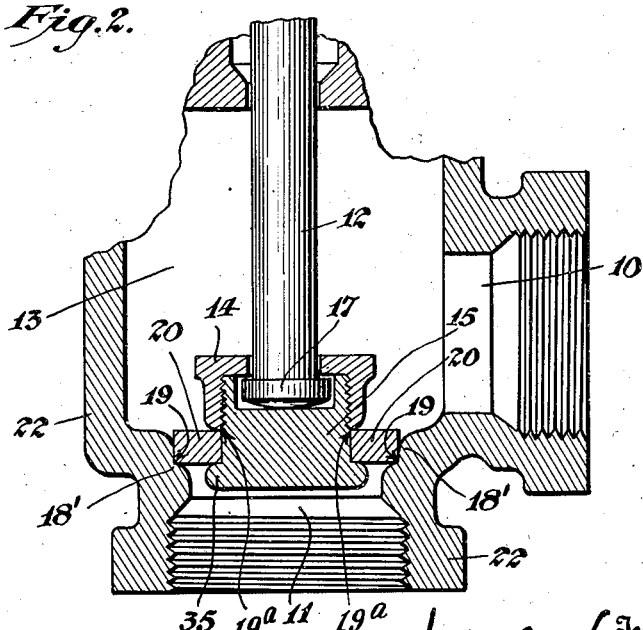
Figure 2 is a sectional view of a mushroom type valve showing a portion of the valve-chamber and the seat adapted to co-operate with such type of valve.

In Figure 2 is shown a valve of the mushroom type having a head 15, to which is secured the valve stem 12 by means of the nut 14. At 20 is an annulus which fits around the valve head 15 and is carried between the enlarged portion 35 of the head and the lower end of the nut 14. The annulus 20 is adapted to seat upon a shoulder 18' in the valve casing and the act of seating said annulus thereon with the required pressure will cause a desired distortion of the annulus, causing a binding effect and consequently a snug fit between annulus-edge 19 and the shoulder 18', and between the diagonally offset annulus-edge 19a and the head 15.

Figure 3:
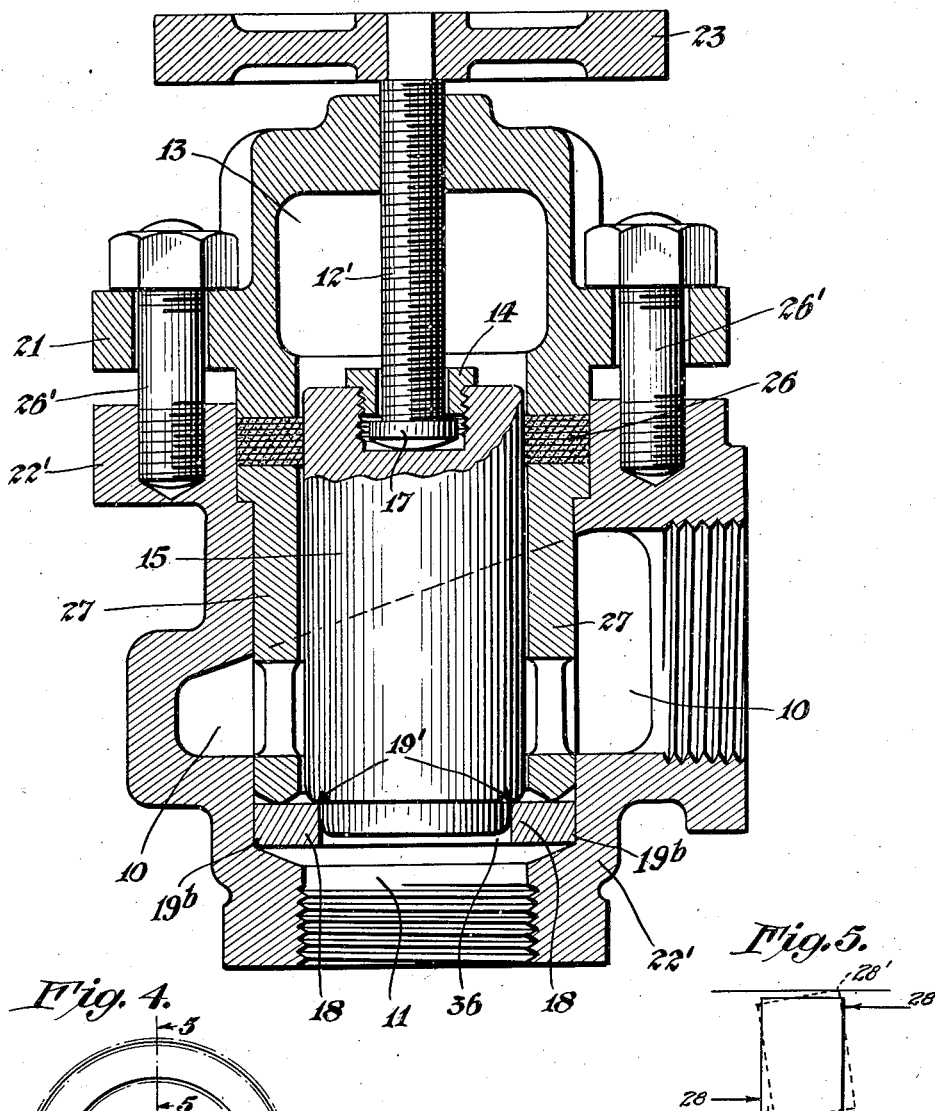
Figure 3 is a similar sectional view of a type of valve and valve-chamber therefor, and a seat adapted to co-operate with such valve, the particular valve herein shown and its attendant parts being intended for steam or high pressure work.

In Figure 3 is disclosed a heavy type of valve adapted for use with steam or high pressure work. In this embodiment of my invention, the valve is provided with a threaded stem 12' having the conventional enlarged head 17 on its lower end and a handwheel 23 on its upper end. The lower end of the stem 12' is secured to the columnar element or valve head 15 by means of the nut 14 as was described with relation to the structure shown in Figure 1.

In the construction disclosed in Figure 3, the casing is divided into two main parts having an upper portion 21 and a lower portion 22'. There is also an inner casing 27 which is contained within the part 22'; and the parts 21 and 27 spaced by a suitable packing 26 forming a tight joint therebetween and also a packing-seal around the valve-head, are bolted together as indicated at 26'. The valve head 15 is of cylindrical form and near its lower end, it is provided with a circumferential shoulder 19' which is intended to co-operate with the extreme upper edge of an opening 36, located in an annulus 18 which forms the valve seat. As was explained with regard to the structure shown in Figure 1, the valve head 15 is securely seated upon the annulus 18 with the shoulder 19' formed on the head 15, coming into firm contact with the upper edge of the opening 36 and applying pressure thereto. This pressure tends to slightly distort the annulus 18 to such an extent as to form the opening 36 into frusto-conical form, causing a gripping action between the upper edge of the opening 36 and that part of the valve head 15, which is located directly beneath the shoulder 19', and between casing and annulus 18 at the diagonally-offset annulus-edge 19b.

In order to further illustrate the principle of my invention, Figures 4 and 5 disclose an annulus 29 similar to that shown in Figures 2 and 3. The full lines in Figures 4 and 5 indicate the normal position of the annulus prior to the application of pressure. When the pressure imposed in seating the valve takes place, distorting movement of the annulus occurs as is indicated in dotted lines, the actual movement of the metallic mass being substantially as is indicated by the arrows 28. It will be seen that the result of such movement tends to cause the central opening, in which a part of the valve extends, to assume, a frusto-conical form, and assure such a gripping effect between the valve head and seat at annulus-edge 28' that an exceptionally satisfactory tight joint is produced, a similar joint being simultaneously produced at the diagonally-offset annulus-edge 28".

The result of my invention is satisfactorily secured when using a plate or annulus as a seat or valve member. The plate may be of any suitable thickness to satisfactorily effect the sealing requirement necessary. Therefore, in referring herein to a plate, I mean a section of metal of such cross-section and obduracy and elasticity as that it is capable of acting as was herein set forth.

It is also desirable that the metal utilized to form the valve seat shall possess sufficient resiliency, while also preferably it should be somewhat obdurate to deformation and elastic as is hard brass or steel, to properly adapt itself to the valve head and assure firm contact therewith upon constant re-application of the valve head against its seat.

Inasmuch as many changes could be made in the above constructions, and many apparently widely different embodiments of the invention could be made without departing from the scope thereof, it is intended that all matter contained in the above description or shown in the accompanying drawings shall be interpreted as illustrative and not in a limiting sense.

It is also to be understood that the language contained in the following claims is intended to cover all the generic and specific features of the invention herein described, and all statements of the scope of the invention which, as a matter of language, might be said to fall therebetween.

Further, in the case of certain couplings or joinings to correlate a plurality of parts other than in fluid confinement work such as pipe coupling, a member or part of non-annular characteristic may be present and form part of a combination whereby such member or part may be distorted or tilted at an edge portion thereof to function pursuant to the invention; within the scope of the appended claims.

While a substantially flat annulus (as annulus has been herein defined) is in every case shown in the drawings as a substantially or practically flat plate, or a plate whose opposite faces are substantially uniplanar and parallel, it will be understood that any annulus is contemplated as coming within the invention,—and as coming within any of the appended claims which call for a "substantially flat" annulus, plate or the like or which call for an annulus, plate or the like the opposite faces of which are "substantially parallel",—where such annulus, is so shaped that, when subjected to a pressure applied against one face and adjacent to the opening therein and when restrained against said pressure at or given an opposing pressure against the opposite face, the annulus is warped at an edge of the opening in such a manner as to function according to the invention. That is to say, the annulus, plate or the like of the invention may be not only a substantially or practically flat plate, as shown, but also quasi-plate-like within any claim or claims incorporating any of the just-above-quoted expressions. "Quasi-plate-like" may best be defined by examples: for instance, an annulus, plate or the like uniplanar on one face and concavely shaped (as conically) on the other, or one uniplanar on one face and convexly shaped (as conically) on the other, or one convexly shaped (as conically) on both faces, or one concavely shaped (as conically) on both faces, or even one concavely thus shaped on one face and convexly thus shaped on the other, provided, in this last case, that the degrees of conicity of such faces (if conical), or the equivalent inclined characteristics of the non-conical convexly and concavely shaped faces, are not such that so little of the pressure or pressures applied to warp an edge or edge portion of the opening acts laterally of the plate as not to cause the plate to function according to the invention.

Also, while an annulus (an annulus has been herein defined) is in every case shown in the drawings as a plate-like entity the opening or hole of which is cylindrical and with the axis of such cylinder substantially perpendicular to a face of such entity, and while each such annulus shown in the drawings, where it is a true annulus (as true annulus has been herein defined), has a peripheral wall substantially cylindrical and with the axis of such cylinder substantially coincident with the axis of the hole or opening, it will be understood that any annulus is contemplated as coming within the invention,—and as coming within any of the appended claims which call for an annulus, plate or the like which is of "substantially rectangular cross section radially" or "substantially cylindrical",—where such annulus is provided with an opening or hole which has a sloping wall, as, for instance, a hole or opening defining a truncated cone where the top and bottom edges of the hole are circular, or (where the annulus is a true annulus) the outer peripheral wall of the annulus is a sloping one, as, for instance, a peripheral wall defining a truncated cone where the top and bottom edges of such wall are circular. In this connection it should be explained that, as the operability of annuli or the like of the kind just above referred to is now understood, the invention is more satisfactorily if not essentially carried out when the smaller end of the hole is at the face of the annulus against which the pressure is applied to warp an edge portion of the hole, and (where the outer peripheral wall is a sloping one) when the reaction against the pressure just mentioned is at or the opposing pressure is directed against the face of the annulus of maximum diameter.

Finally, an "obdurate" material as that term is used hereinabove and in certain of the appended claims, may perhaps be best defined as a material which is more elastically yielding to pressure than plastically deformable under pressure in the manner in which lead or other gasket material is so plastically deformable.

Obviously, in carrying out the invention, the material of the element against which a warped edge operates for attaining any explained purpose of the invention, or of an element pressed or held against the edge-carrying element to cause such warping, is obdurate, as the latter word has been defined herein, or at least of an unyielding and fairly hard character.

I claim:

1. In a valve, the combination with a valve seat supporting member and a valve member, one movable relative to the other, of an apertured plate supported on one of said members, said plate being of elastic material, the plate supporting member engaging the plate on one face thereof at points beyond the aperture, and the other member engaging the opposite face of the plate when the valve parts including said plate are forced together for valve closing, the last mentioned plate engagement being along a line spaced from the points of the first mentioned engagement relative to the axis of the valve, whereby the forcing together of said valve parts imparts to the plate an impermanent warping to cause an edge thereof to be shifted in a direction approximately parallel to the initial plane of the plate to assist in bringing about a fluid-tight closure of the valve.

2. In a valve, the combination with a valve seat supporting member and a valve member, one movable relative to the other, of an apertured plate on one of said members, said plate being of sensible thickness relative to the selected area of said aperture, the plate supporting member engaging the plate on one face thereof at points beyond the aperture, and the other member engaging the opposite face of the plate when the valve parts including said plate are forced together for valve closing, the last mentioned plate engagement being applied at a point spaced from the points of the first mentioned engagement relative to the axis of the value, whereby the forcing together of said valve parts serves to deform the plate to cause edge portions of the plate about the aperture, on opposite faces of the plate, to move relative to each other, to assist in bringing about a fluid-tight closing of the valve.

3. In fluid control work, the method of producing intimate contact between all parts of a perimetal edge on a substantially flat plate, and an adjacent surface, which involves providing such plate in adjacency to such surface, and applying opposing pressures to said plate on opposite sides thereof and staggered relative to the flat surfaces of the plate to cause said edge to move to engage said surface in a fluid tight manner.

4. In a device of the kind described, means for sealing a columnar element perimetally, including a plate having an opening substantially conforming to such perimeter, in combination with means for causing an edge of the wall of the plate opening and a zone of the plate outward of and surrounding the plate opening and longitudinally substantially conforming to the plate opening, to move relatively to each other, the last mentioned means including an agency for applying pressure at an angle to the flat of the plate and at one side thereof and means for simultaneously opposing the stated pressure at an angle to the flat of the plate at the opposite side thereof.

5. In a device of the kind described, means for sealing a columnar element circumferentially at a circular peripheral line thereof, including an annulus having its opposite cross-axial faces substantially parallel, in combination with means for causing the outer periphery and the inner circumference of the annulus to move cross-axially relative to each other, the means last mentioned including resistance means acting in a direction substantially cross-axial to the annulus.

6. In a device of the kind described, in combination with a member to be gripped girthwise, an annulus of obdurate material for girthing said member, means for subjecting said annulus to pressure at an angle to its general plane, and means for holding said annulus against said pressure, said pressure applying and holding means being applied to the annulus at opposite sides thereof and at points staggered radially of the annulus, to impart a contracting effect to the inner circumferential portion of the annulus.

7. In a device of the kind described, the combination of relatively approachable members one of which is a deformable annulus of obdurate material, and means for engaging said annulus at diagonally opposite points, said points at opposite faces of the annulus and one nearer the inner circumference of the annulus than the other.

8. In a valve, the combination of a valve seat and a valve member, one of which is constructed as an annular ledge of substantial thickness and having an approximately cylindrical inner circumferential portion of substantial area, and means including a valve-member actuator for applying a transverse bending force to said annular ledge at the inner circumferential portion thereof to obtain a sealing effect between valve-seat and valve member.

9. In a valve, a casing of obdurate material having a warpable ledge-like annulus therein of substantial thickness and having an approximately cylindrical surface of substantial area, in combination with a movable valve member, and means for guiding said member to coact with said annulus by elastically flexing said annulus, thereby to effect a fluid-tight valve closure between member and annulus; said annulus being secured within said casing to hold its outer peripheral boundary fixed to said casing against movement in a direction the same as the valve closing movement of the valve member.

10. In a valve, a housing, a warpable seat-carrying entity of dense and slightly compressible material, of substantial thickness and having an approximately cylindrical surface of substantial area, a movable valve member, and means for forcing said member against such seat to contract an edge of said cylindrical surface to effect a warp-seal drive-fit with said member.

11. In a valve, a valve-seat ledge comprising an annulus of substantially rectangular cross section radially, a valve member for coacting with such seat, and means including said valve member for engaging and pressing circumferential portions of said annulus on opposite faces and at diagonally opposite points to impart a cross-axial deflection to the annulus, to contract the opening therein about said member; said annulus being of obdurate material.

12. A valve comprising a casing presenting a valve seat, a valve member, and a carrier for said member, said member being an annulus of substantial thickness and having a substantially cylindrical sealing surface of substantial area, and shaped to be canted by radially staggered opposing pressures thereagainst, there being means including said carrier and seat for canting the member on valve-closing.

13. A valve structure including a seat and valve member pair, one of which is an annulus having inner circumferential edges, and means for effecting axial approach of said pair and for then relatively moving inner circumferential edge portions of the annulus, said means including said seat.

14. The method of effecting a sealing engagement between a valve member and a substantially concentric valve-seat member, which involves providing one of said two elements as an apertured annulus of substantial thickness and having an approximately cylindrical sealing surface of substantial area, and bending the latter transversely to effect a contraction of the inner circumferential marginal portion thereof.

15. In a valve, a fluid-tight closing means including a valve member and a substantially concentric valve-seat member, one of the two elements just named comprising a substantially flat ring of sensible thickness and of obdurately deformable material; said means also including clamping means engaging the opposite faces of said ring at diagonally opposite points along radial lines of the ring.

16. The method of effecting a fluid-tight collaring of an object to be collared, which involves placing an annulus of appreciable thickness about the object and then moving circular edge portions of the annulus in radially opposite directions at the opposite faces thereof.

17. In a valve, the combination of a sealing instrumentality of dense slightly compressible elastic material, and means for relatively moving said instrumentality to a cooperating sealing wall and bending said instrumentality, said instrumentality having a normally cylindrical opening and such bending distorting the wall of such opening from the cylindrical.

18. The method of effecting a close coupling between an annulus and a substantially concentric object, which involves applying oppositely directed pressures to opposite sides of the annulus so positioned as to distort the wall of the opening in the annulus to an abnormal shape defining a truncated cone, thereby to effect the aforesaid coupling by decreasing the diameter of the opening at a predetermined surface of the annulus.

19. The method of producing pressure-intensified intimacy of contact between an edge defining part of an opening in a substantially flat plate, and an adjacent surface, the plate being of substantial thickness and its opening having substantial extent in the axial direction, which includes flexing the plate transversely to tilt said edge toward said surface.

20. The method of producing intimate contact between an edge on a practically flat plate, and an adjacent surface, which includes providing such plate with an edge adjacent said surface, and tilting said plate in its portion contiguous to said edge thereby to tilt said edge toward said surface.

21. The method of effecting a sealing engagement between a valve member and a substantially concentric valve-seat member, which involves providing one of said two elements as an annulus and bending the latter transversely to effect relative radial movements of opposite circumferential marginal portions thereof.

22. A valve comprising a casing formed with a passageway, an apertured sealing ring closely fitting in said passageway, a movable valve member having a part formed to fit closely within the aperture of the sealing ring, means carried by the valve member and extending radially beyond the aperture of the sealing ring to engage one of the side faces of the sealing ring when the valve member is moved to sealing position to carry the inner part of the sealing ring a limited distance in the direction of closing movement of the valve, stop means carried by the casing to hold the outer part of the ring against movement, the parts being so formed that when the valve member is moved toward sealing position the sealing ring is deformed to cause an outer peripheral edge to form a sealing engagement with the wall of the said passageway, while the diagonally opposite inner edge forms a sealing engagement with the movable valve member.

23. A valve comprising a casing formed with a passageway, an apertured sealing ring of obdurate, elastic material closely fitting in said passageway, a movable valve member having a part formed to fit closely within the aperture of the sealing ring, means carried by the valve member and extending radially beyond the aperture of the sealing ring to engage one of the side faces of the sealing ring when the valve member is moved to sealing position to carry the inner part of the sealing ring a limited distance in the direction of closing movement of the valve, stop means carried by the casing to hold the outer part of the ring against movement, the parts being so formed that when the valve member is moved toward sealing position the sealing ring is deformed to cause an outer peripheral edge to form a sealing engagement with the wall of the said passageway, while the diagonally opposite inner edge forms a sealing engagement with the movable valve member.

24. A valve comprising a casing formed with a passageway, an apertured sealing ring of obdurate, elastic material and of substantially rectangular cross section closely fitting in said passageway, a movable valve member having a part formed to fit closely within the aperture of the sealing ring, means carried by the valve member and extending radially beyond the aperture of the sealing ring to engage one of the side faces of the sealing ring when the valve member is moved to sealing position to carry the inner part of the sealing ring a limited distance in the direction of closing movement of the valve, stop means carried by the casing to hold the outer part of the ring against movement, the parts being so formed that when the valve is moved toward sealing position the sealing ring is deformed to cause an outer peripheral edge to form a sealing engagement with the wall of the said passageway, while the diagonally opposite inner edge forms a sealing engagement with the movable valve member.

25. A valve comprising a valve casing formed with a cylindrical passageway, an apertured sealing ring closely fitting in said passageway, a stop shoulder extending into the passageway and engaging one of the outer corners of the sealing ring, a tubular inner casing extending into the passageway and engaging the sealing ring on the side opposite the stop shoulder, means for holding the inner casing in place, a cylindrical valve member movable within the inner casing, the valve member having a reduced portion adapted to fit closely within the aperture of the sealing ring, and having also a shoulder engaging the sealing ring on the side opposite the stop shoulder, the wall of the inner casing being formed with a port, the valve casing being formed with a port in communication with the port in the inner casing, and the valve casing being formed with a second port in communication with the cylindrical passageway.

In testimony whereof I affix my signature.

WYLIE G. WILSON.